United States Patent [19]

Taue et al.

[11] Patent Number: 4,964,571
[45] Date of Patent: Oct. 23, 1990

[54] ACTUATOR FOR ACCUMULATOR TYPE FUEL INJECTION NOZZLE

[75] Inventors: Jun Taue; Takeo Yoshida, both of Iwata, Japan

[73] Assignee: Yamaha Hatsudoki Kabushiki Kaisha, Iwata, Japan

[21] Appl. No.: 318,666

[22] Filed: Mar. 3, 1989

[30] Foreign Application Priority Data

Mar. 4, 1988 [JP] Japan .................................. 63-50954

[51] Int. Cl.$^5$ ............................................ F02M 51/00
[52] U.S. Cl. ...................................... 239/88; 239/124; 239/585; 251/129.1
[58] Field of Search .................... 239/88, 91, 95, 124, 239/533.3, 533.12, 585; 251/129.09, 129.1, 129.22

[56] References Cited

U.S. PATENT DOCUMENTS

| | | | |
|---|---|---|---|
| 3,361,161 | 1/1968 | Schwartz | 239/585 |
| 3,412,971 | 11/1968 | McDivitt | 251/129.1 |
| 4,714,066 | 12/1987 | Jordan | 239/88 |

FOREIGN PATENT DOCUMENTS 03836865 9/1986 Switzerland .

Primary Examiner—Andres Kashnikow
Assistant Examiner—Karen B. Merritt
Attorney, Agent, or Firm—Ernest A. Beutler

[57] ABSTRACT

An accumulator type fuel injection nozzle including a resistor in the actuating electromagnet of the relief valve for controlling the operation of the valve. In the illustrated embodiment, there are provided two electromagnets, one of which opens the relief valve and the other of which closes the relief valve. In addition, a thermistor is provided in the circuit to the electromagnet so as to render the device substantially temperature insensitive.

15 Claims, 1 Drawing Sheet

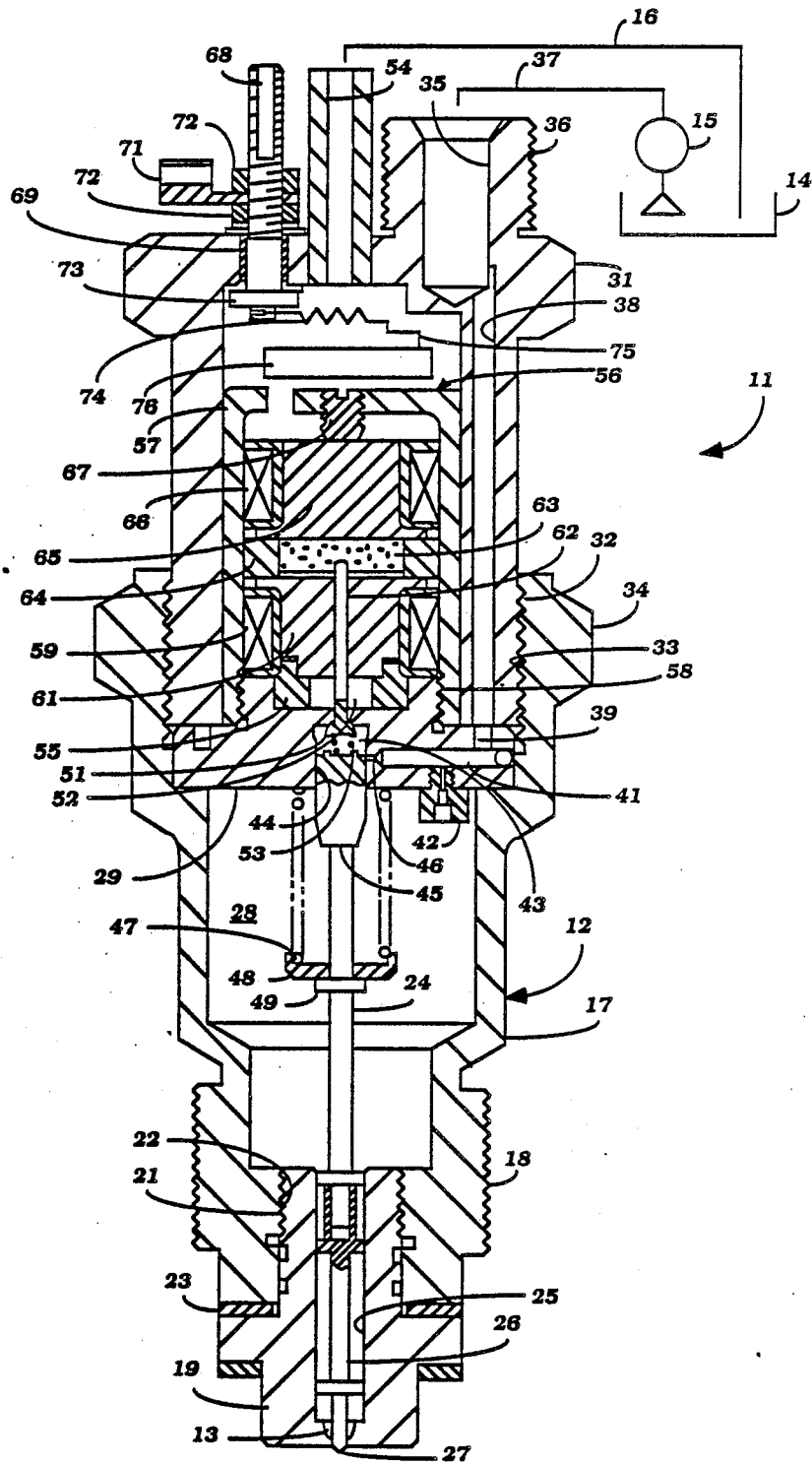

ACTUATOR FOR ACCUMULATOR TYPE FUEL INJECTION NOZZLE

BACKGROUND OF THE INVENTION

This invention relates to an actuator for an accumulator type fuel injection nozzle and more particularly to improved actuator structure that permits better control over the fuel injection delivery.

A well known and popular type of fuel injector is the so-called accumulator type. With this type of fuel injection system, there is provided an accumulator chamber which is charged with fuel under pressure. The flow controlling discharge valve of the nozzle has an actuator that is mounted in a small control chamber that is also pressurized with fuel under pressure. When it is desired to inject fuel, the pressure in the control chamber is rapidly reduced by opening a relief valve for that chamber and the pressure in the accumulator chamber opens the injection valve and permits the fuel to be discharged.

One common type of system for actuating the relief valve includes an electromagnet that biases the relief valve to one of its positions, normally the open one, when energized so as to effect the fuel injection. Although such arrangements have particular utility, they make it difficult to control the actual amount of the fuel injected and the timing of the opening and closing of the injection valve.

It is, therefore, a principal object of this invention to provide an improved electromagnet arrangement for an accumulator type fuel injection nozzle.

It is a further object of this invention to provide an electromagnet assembly for operating an accumulator type fuel injection valve and wherein the operation of the electromagnet can be easily tuned to provide the desired flow conditions.

In conjunction with the use of such electromagnetically controlled fuel injection nozzles, it is important to insure that the device will be relatively temperature insensitive. This is particularly true when a resistor is utilized in the circuit for energizing the electromagnet to alter its performance.

It is, therefore, a still further object of this invention to provide an improved electromagnet control for a fuel injection nozzle that incorporates a temperature compensation system.

In connection with nozzles of this type, it is normally the practice to utilize only a single electromagnet that operates the relief valve in one direction, normally the opening direction. When a single electromagnet is employed, it is necessary to energize the magnet during the entire time that fuel is being discharged. This requires relatively high current loadings for fairly extensive periods of time. As a result, it is necessary to employ fairly substantially sized coils in order to provide the necessary force for holding the valve open for such long periods of time.

It is, therefore, a still further object of this invention to provide an improved arrangement wherein the coil size for the energizing the relief valve can be minimized.

It is a further object of this invention to provide an arrangement wherein separate coils are provided for both opening and closing the relief valve of an accumulator type fuel injection nozzle.

SUMMARY OF THE INVENTION

This invention is adapted to be embodied in an accumulator type injection nozzle that is comprised of an accumulator chamber that is adapted to be supplied with high pressure fuel. A nozzle port leads from the accumulator chamber and an injection valve is moveable between a closed position and an open position for controlling the discharge of fuel from the accumulator chamber through the nozzle port. A control chamber is also incorporated that receives pressurized fuel and a control member is supported for movement within the control chamber and is associated with the injector valve for retaining the injector valve in its closed position when the control chamber is pressurized and for movement of the injector valve to its open position when pressure is relieved in the control chamber. A relief valve means is moveable between a closed position for maintaining pressure in the control chamber and an opened position for relieving pressure in the control chamber for effecting fuel discharge through the nozzle port. In accordance with the invention, electromagnetic means are associated with the relief valve means for urging the relief valve means to one of its positions when the electromagnetic means is energized. Electrical resistive means are incorporated in the circuit for the electromagnetic means for varying the force exerted by the electromagnetic means.

BRIEF DESCRIPTION OF THE DRAWINGS

The single figure of the drawings is a cross-sectional view of a fuel injection nozzle constructed in accordance with an embodiment of the invention, with the associated fuel supply and return system being shown schematically.

DETAILED DESCRIPTION OF THE PREFERRED EMBODIMENT OF THE INVENTION

Referring to the single figure of the drawings, a fuel injection nozzle constructed in accordance with an embodiment of the invention is identified generally by the reference numeral 11. The injection nozzle 11 is comprised of an outer housing assembly, indicated generally by the reference numeral 12 that is adapted to be mounted, in a manner to be described, in the cylinder head of an internal combustion engine with a nozzle port 13 communicating with the combustion chamber for delivering fuel to it in a manner to be described. Rather than direct cylinder injection, the invention may be utilized in conjunction with manifold injection systems but the invention has particular utility with direct injection, for example as used with high speed diesel engines.

Fuel is supplied to the injection nozzle 11 from a remotely positioned fuel tank 14 by means of a high pressure pump 15. Excess fuel is returned back to the reservoir 14 through a return line 16. The fuel delivery and return systems per se form no part of the invention and, for that reason, they have been illustrated only schematically.

The outer housing 12 is comprised of a lower piece 17 that has a threaded lower end 18 that is adapted to be threaded into a suitable aperture in the cylinder head of the associated engine (not shown) in a known manner. The nozzle port 13 is defined by a tip 19 that has a threaded portion 21 that is received in a threaded bore 22 formed at the lower end of the housing piece 17. An adjusting shim 23 is interposed between the nozzle piece 19 and housing 17 for length adjustment.

An injection valve 24 is slidably supported within a bore 25 of the nozzle piece 19 and has a reduced diameter portion 26 and a flow controlling tip 27 which, in the closed position, closes the injection nozzle port 13. The valve portion 26 has interrupted enlargements for slidably supporting the injection valve 24 in the bore 25 in a known manner.

An accumulator chamber 28 is formed above the bore 25 by the housing piece 17. The accumulator chamber 28 is closed at its upper end by means of a closure plate 29 that is held against a shoulder in the housing piece 17 by a second housing piece 31. The housing piece 31 has a threaded portion 32 that is received within a threaded bore 33 of the housing piece 17 so as to hold the closure plate 29 in position and maintain the chamber 28 in a sealed condition, except as is hereinafter noted. Externally of the threaded opening 33, the housing piece 17 is formed with a hexagonal portion 34 so as to facilitate its insertion into the threaded bore of the cylinder head.

The housing piece 31 is formed with an inlet conduit 35 that has a threaded external portion 36 so as to receive a fitting for connecting a supply line 37 extending from the pressure pump 15 to the inlet conduit 35.

The inlet conduit 35, which is generally a drilled opening, is intersected by a further drilled passageway that extends axially along the housing piece 31 at one side thereof and which communicates at its lower end with a corresponding circumferential groove 39 formed in the upper surface of the closure plate 29. The groove 39 is intersected by a radially extending bore 41 which, in turn, has tapped into it a metering jet 42 for delivering fuel under pressure to the accumulator chamber 28.

A control chamber 43 is formed in the closure plate 29 by means of a bore 44 that opens through the lower end of the closure plate. The injection valve 24 has a generally cylindrical actuator portion 45 that is slidably supported within the bore 44 and which closes the lower end of the control chamber 43. A restricted orifice 46 communicates the control chamber 43 with the passage 41 so as to pressurize the control chamber 43 and normally urge the injection valve 24 toward its downward or closed position.

A coil compression spring 47 encircles the injection valve 24 and bears against the closure plate 29 at its upper end. The lower end of the spring 47 engages a cup shaped retainer 48 that is held axially in position against a shoulder formed by an enlargement 49 on the injection valve 24 so as to further assist in maintaining the injection valve 24 in the closed position as shown in the drawing.

A relief valve 51 is supported within the upper end of the closure plate 29 and controls the opening of a relief passage 52 formed in the upper end of the closure plate 29. The relief valve 51 is normally biased to a closed position by means of a light return spring 53 although the spring 53 may be dispensed with if desired.

The relief valve 51 when opened will permit the fuel in the control chamber 43 to return to the tank 14 through a return fitting 54 that extends axially through the end of the housing piece 31 parallel to the inlet passageway 35. The return passageway 54 communicates with the conduit 16.

Fuel can flow from the relief valve passageway 52 to the return passageway 54 through an opening formed in a spacer ring 55 that is engaged within a counter bore formed in the upper end of the closure plate 29. Suitable internal passageways or clearances will permit this return flow, which is relatively small in volume.

The relief valve 51 is opened and closed so as to control the discharge of fuel from the nozzle port 13 by means of an electromagnetic assembly, indicated generally by the reference numeral 56. This electromagnetic assembly 56 includes a generally cylindrical yoke 57 that has a threaded opening at its lower end which is received on a threaded portion 58 of the closure plate 29 so as to secure the assembly in position. The spacer ring 55 serves to control the axial positioning of the magnet assembly 56 within the outer housing 12.

The electromagnetic assembly 56 is comprised of a first solenoid coil or winding 59 that is disposed at the lower end of the housing or yoke 57 and which encircles an armature 61. The armature 61 is formed with a bore that slidably supports an extension 62 of the relief valve. This extension 62 carries a permanent magnet 63 at its upper end. The permanent magnet is slidably supported for axial movement within a further spacer sleeve 64 that is contained between the armature 61 and an armature 65 of a second electromagnet that includes a coil or solenoid winding 66. The winding 66 encircles the armature 65 and is held axially in position by means of a set screw 67 that is threaded into an end of the yoke 57 to hold the assembly in position.

It should be noted that each of the coils 59 and 61 is provided with a circuit for energizing it. Since the figure is only a single cross-section, only the circuit associated with the winding 66 has been illustrated. It is to be understood, however, that a similar circuit is used in connection with the winding 59.

Because of the use of two separate coils 59 and 66 and the permanent magnet 63 associated with the relief valve 51, it is possible to both open and close the relief valve 51 through the mere provision of a pulse of electricity through the respective coil 59 or 66 will attract the permanent magnet 63 to the respective armature 61 or 65 and then the permanent magnet will hold the relief valve 51 in the respective position. As a result, the individual coils can be considerably smaller than arrangements wherein a single coil is utilized to open the valve and must be energized all the time that the valve is held in its open position. This provides an obviously more compact assembly.

This circuit includes a terminal post 68 that extends through the upper end of the housing piece 31 with an insulating sleeve 69 being interposed between the housing piece 31 and the terminal post 68. An electrical tab connector 71 is held on the post 68 in electrical contact with it between a pair of nuts 72 so as to afford attachment to an appropriate lead of a circuit (not shown).

The terminal post 68 has affixed to its lower end a conductive nut 73 that forms a circuit with a resistor 74 and conductor 75. The conductor 75 is in contact with a suitably valued thermistor 76 and the winding 66. By varying the resistor 74 and appropriately controlling the selection of the thermistor 76, the device will be temperature compensated and the resistor 74 will control the operation and response of the winding 66. In this way, the winding 66 and 59 may be tuned separately from each other so as to provide different rates of opening and closing, as will now be described. In some embodiments, however, a single resistor 74 and thermistor 76 may be utilized for both the coils 59 and 66.

The condition shown in the single figure is that which occurs when the winding 66 has been energized. When the winding 66 is energized the magnet 63 will be attracted by the flux generated in the armature 65 and the relief valve 51 will be held in its closed position so that the accumulator chamber 28 and control chamber 43 may be pressurized. Because of the use of the permanent magnet 63, the valve 51 will be held in this position and the winding 66 can be energized only briefly.

At the appropriate instant for fuel injection to begin, which may be controlled in any suitable strategy, the winding 59 is energized. When this happens, the permanent magnet 63 will be attracted downwardly by the flux in the armature 61 so as to urge the valve portion 62 downwardly and open the relief valve 51 against the action of the light spring 53. The magnet 63 will then hold the valve 51 in this position. The pressure in the control chamber 43 will then be rapidly depleted and the higher pressure of the fuel acting in the accumulator chamber 28 will urge the injection valve 24 upwardly and permit fuel to issue from the nozzle port 13. When the fuel pressure in the accumulator chamber 28 has been depleted, the spring 47 will move the injection valve 24 to its closed position and the fuel pressure can then build up in the accumulator chamber 28. This action is initiated by reenergizing the winding 66 so as to close the relief valve 51 and permit pressure in the control chamber 43 to again build up.

It should be readily apparent from the foregoing description that a very effective fuel injection nozzle is illustrated and described and one in which the discharge characteristics can be easily changed by changing the values of the resistors associated with the respective windings. The use of the thermistors in these circuits insures that the device will be stable at all temperatures. Also the use of two coils and a permanent magnet permit the use of less electrical force and smaller coils.

Although an embodiment of the invention has been illustrated and described, various changes and modifications may be made without departing from the spirit and scope of the invention, as defined by the appended claims.

We claim:

1. An accumulator type of injection nozzle comprised of an accumulator chamber adapted to be supplied with high pressure fuel, an nozzle port leading from said accumulator chamber, an injection valve moveable between a closed position and an opened position for controlling the discharge of fuel from said accumulator chamber through said nozzle port, a control chamber for receiving pressurized fuel, an actuating member supported for movement within said control chamber and associated with said injector valve for retaining said injector valve in its closed position when said control chamber is pressurized and for movement of said injector valve to its opened position when pressure is relieved in said control chamber, and relief valve means moveable between a closed position for maintaining pressure in said control chamber and an opened position for relieving said control chamber for effecting fuel discharge through said nozzle port, the improvement comprising electromagnetic means associated with said relief valve means for urging said relief valve means to one of its positions when said electromagnetic means is energized, and electrical resistor means in circuit with said electromagnetic means for varying the force exerted by said electromagnetic means by selecting the value of said electrical resistor means.

2. An accumulator type of injection nozzle as set forth in claim 1 further including thermistor means in circuit with said electrical resistor means and said electromagnetic means for rendering the system substantially insensitive to temperature variations.

3. An accumulator type of injection nozzle as set forth in claim 2 wherein the resistor means and the thermistor means are positioned in a fuel chamber of the fuel injection nozzle.

4. An accumulator type of injection nozzle as set forth in claim 1 further including second electromagnetic means associated with said relief valve means for urging said relief valve means to the other of its positions when said second electromagnetic means is energized.

5. An accumulator type of injection nozzle as set forth in claim 4 further including second electrical resistor means in circuit with the second electromagnetic means for varying the force extended by said second electromagnetic means by selecting the value of said electrical resistor means.

6. An accumulator type of injection nozzle as set forth in claim 5 further including at least one thermistor in electrical circuit with at least one of said electrical resistor means for rendering the device temperature insensitive.

7. An accumulator type of injection nozzle as set forth in claim 6 wherein the resistor means and the thermistor are positioned within a fuel chamber of the fuel injection nozzle.

8. An accumulator type of injection nozzle as set forth in claim 7 wherein there are a pair of thermistors each in circuit with a respective one of the electrical resistors.

9. An accumulator type of injection nozzle as set forth in claim 8 wherein both of the thermistors are in the same fuel chamber.

10. An accumulator type of injection nozzle as set forth in claim 4 wherein the relief valve means includes a permanent magnet interposed between the armatures of the two electromagnets.

11. An accumulator type of injection nozzle as set forth in claim 10 further including second electrical resistor means in circuit with the second electromagnetic means for varying the force exerted by said second electromagnetic means.

12. An accumulator type of injection nozzle as set forth in claim 11 further including at least one thermistor in electrical circuit with at least one of said electrical resistor means for rendering the device temperature insensitive.

13. An accumulator type of injection nozzle as set forth in claim 12 wherein the resistor means and the thermistor are positioned within a fuel chamber of the fuel injection nozzle.

14. An accumulator type of injection nozzle as set forth in claim 13 wherein there are a pair of thermistors each in circuit with a respective one of the electrical resistors.

15. An accumulator type of injection nozzle as set forth in claim 14 wherein both of the thermistors are in the same fuel chamber.

* * * * *